May 7, 1957 L. STANETZKI 2,791,065

MAGNETIC TOYS

Filed March 25, 1953 4 Sheets-Sheet 1

Inventor
Lothar Stanetzki
BY
Merchant & Merchant
ATTORNEYS

May 7, 1957 L. STANETZKI 2,791,065

MAGNETIC TOYS

Filed March 25, 1953 4 Sheets-Sheet 2

Inventor

Lothar Stanetzki

BY

Merchant & Merchant

ATTORNEYS

May 7, 1957

L. STANETZKI 2,791,065

MAGNETIC TOYS

Filed March 25, 1953

4 Sheets-Sheet 3

Inventor

Lothar Stanetzki

BY

Merchant & Merchant

ATTORNEYS

Inventor

Lothar Stanetzki

BY

Merchant & Merchant

ATTORNEYS

United States Patent Office 2,791,065

Patented May 7, 1957

2,791,065

MAGNETIC TOYS

Lothar Stanetzki, Bonn, Germany

Application March 25, 1953, Serial No. 344,493

Claims priority, application Germany April 10, 1952

6 Claims. (Cl. 46—240)

My invention relates to magnetic toys comprising at least one magnet movable beneath a gaming table or plane, the magnet being an electro-magnet or a permanent magnet.

In particular the invention relates to those magnetic toys in which play figures, carriages or the like are guided by an electro-magnet or a permanent magnet actuating the play figures through an intermediate layer forming the game table, the magnet being moved by operating a handle or the like.

One object of my invention consists in the provision of a magnetic toy in which each magnet is guided individually by one handle only.

A further object of my invention is the provision of a magnetic toy in which the movement of the handle is exactly transmitted to the magnet in an enlarged scale, the ratio being the same all over the playing table or square.

A preferred field of application of the idea of my invention is not only toys but also didactic plays, slot-machine games or the like.

Further objects and features of my invention will become clear from the following description together with the attached drawings and claims.

In the drawing—

Figure 7:
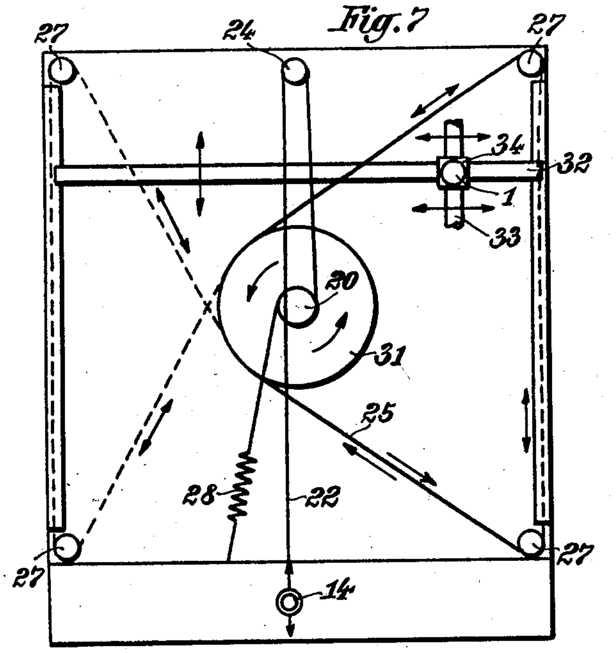
Figs. 7 and 8 show in a plan view a different moving lever system for the magnet separated for the both moving directions.
Figure 8:
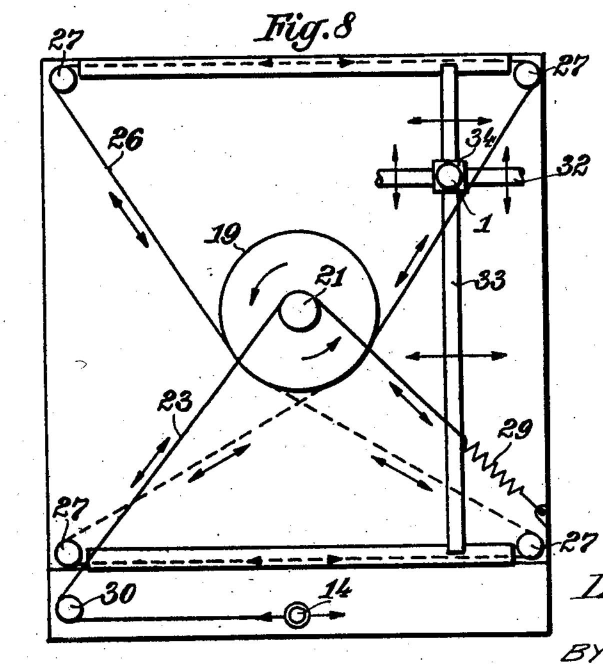
Figure 10:
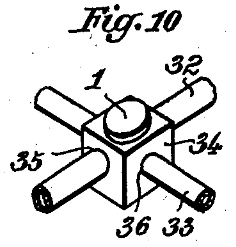

Fig. 10 the support of the magnet in connection with a driving lever system according to Figs. 7 and 8.

Figure 11:
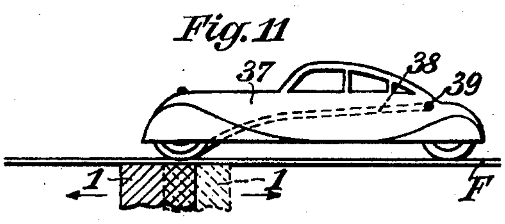
Figure 12:
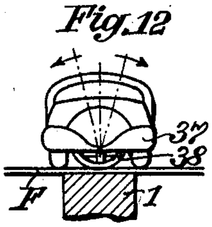
Figure 13:
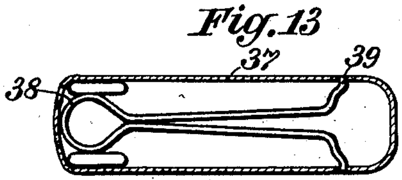
Figure 14:
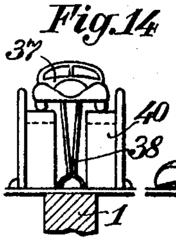
Figure 15:
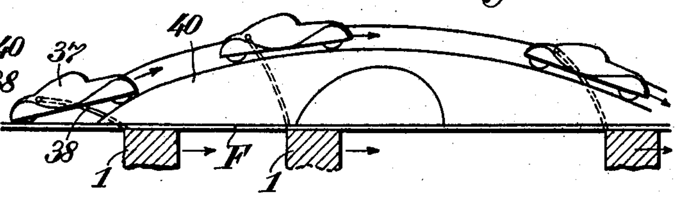
Figure 16:
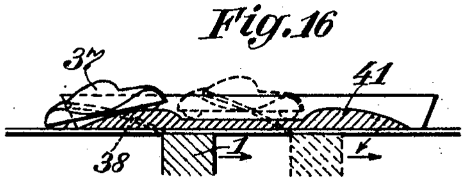

Figs. 11 to 13 show in different views a toy automobile to be used in connection with magnetic toys according to the present invention and Figs. 14 to 16 several modes of application for said automobiles.

Figure 17:
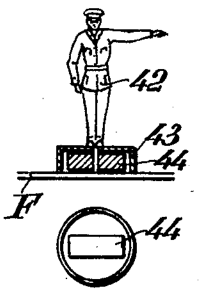
Figure 18:
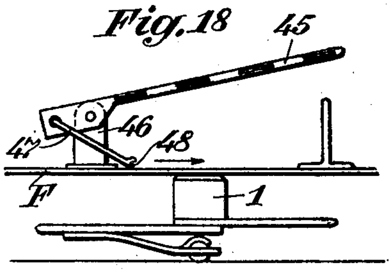

Figs. 17 and 18 show two further toy figures to be used in connection with the magnetic toy according to the invention.

In the drawings the same parts are designated with the same reference characters throughout.

Referring now in particular to Figs. 1, 2, 5 and 6 the magnet, shown in all figures as a permanent magnet, is designated 1. The magnet 1 is supported by a parallelogram lever system which may take the form of a double pantographic lever system or of Nuremberg scissors. The lever system directly supporting the magnet 1 is designated 2. Said system will be moved by the lever system 3 in a manner to be described below which in turn, is moved by the inner extremity of a handle 5 universally fulcrummed on game table F by a ball joint 4. The handle is universally joined to a guiding support 6, to which lever system 3 is joined.

Figure 1:
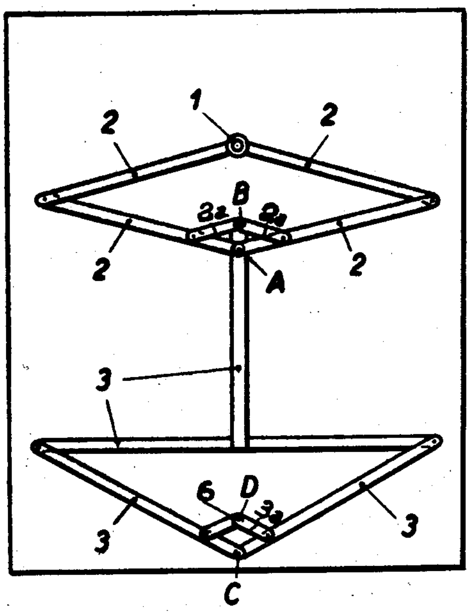
Fig. 1 is a diagrammatic plan view of an embodiment of the invention illustrating one form of a transmitting lever system which may be used.
Figure 2:
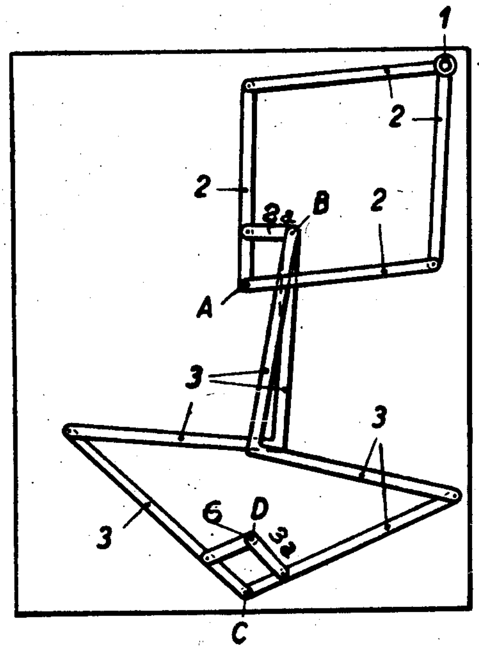
Fig. 2 is a similar plan view, the lever system and the magnet being shown in a different position.

The operation of the arrangement will become clear from Fig. 1 when compared with Fig. 2. The lever system 3 operated directly by the handle 5 is supported at C in a fixed pivot. The handle 5 engages the guiding support 6 at the movable pivot D of the intermediate lever system 3*a*. If, by moving of the handle 5, the point D is moved in any direction this movement is transmitted unto the pivot point B to which an intermediate lever system 2*a* of the second lever system is pivoted. The second lever system 2 is rotatably supported at point A. The movement of point B is transmitted to the magnet 1 by this lever system 2 in such a manner that all movements of the handle 5 effect the similar but enlarged movement of magnet 1 which may be guided to every single point of the playing table or field except point A. It will be noted that a ratio between the movements of handle 5 and magnet 1 will be the same throughout the whole playing table.

Figure 3:
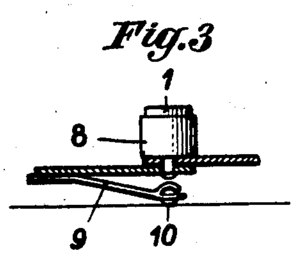
Fig. 3 is an elevational view, partly in section illustrating a detail of the magnet guiding means and Fig. 4 a sectional elevation through the bearing of the handle.
Figure 4:
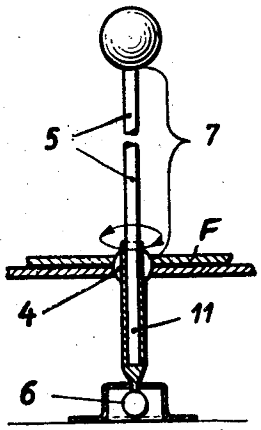

According to Fig. 4 the handle 5 may be inserted into a bushing 11 which is, at one end, supported within ball joint 4 and may be swung or turned in all directions and bears at its end the guiding support 6. The length 7 of the handle 5 projecting over the game table or field F may be chosen so that a sensitive guiding of the magnet is possible. The magnet 1 is, according to Fig. 3, supported in a sleeve 8 and the resilient means 9 bearing at its end the ball 10 bears against the bottom of the toy case in such a manner that the magnet 1 is pressed close to the underside of the game table F.

Figure 5:
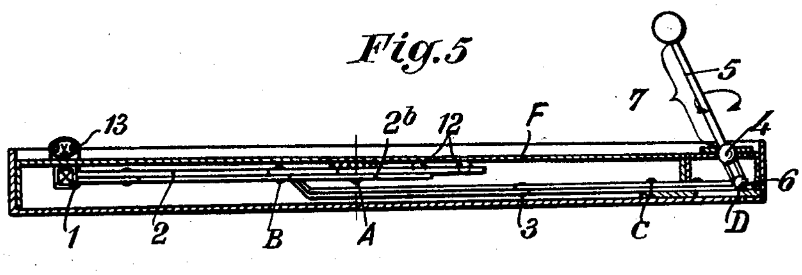
Fig. 5 is a longitudinal central sectional elevational view of a magnetic toy according to the invention along the vertical middle line in Fig. 1 or 2.
Figure 6:
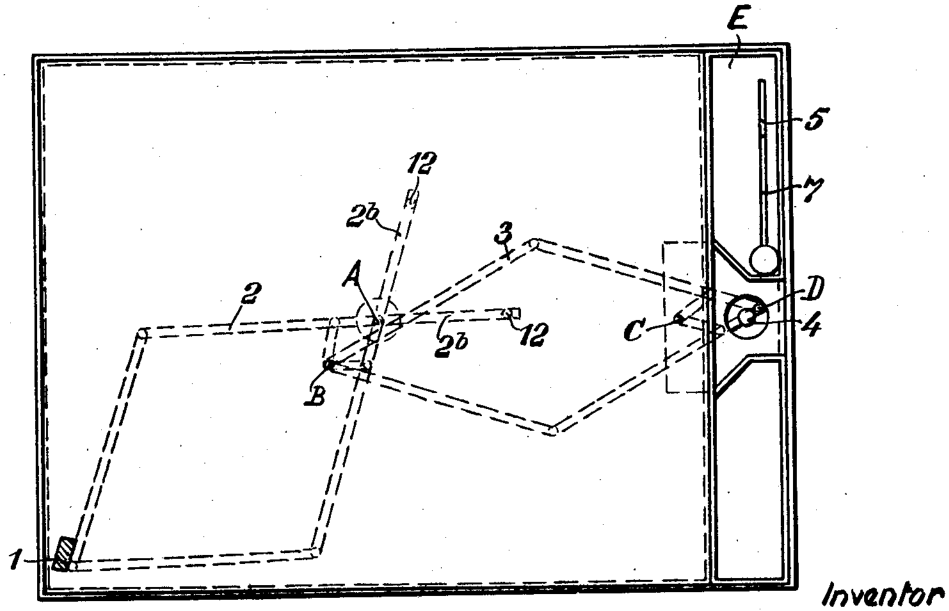
Fig. 6 is a diagrammatic plan view of a magnetic toy showing a modification of the guiding lever system.

Generally the same arrangement is shown in Figs. 5 and 6, with the difference that the ends of the leverage 2 are prolonged at 2*b* and carry running balls 12 bearing from the underside against the game table. Since the leverage 2 is fixedly supported at A, the bearing engagement of the balls 12 with the bottom of table F causes the magnet 1 supported at the opposite end of the leverage 2 to press firmly against table F, thereby affording good magnetic engagement with the toy figure 13, which may be an auto-car or the like, through the cardboard forming the gaming square.

A further difference of the objects of Figs. 5 and 6 to the objects of Figs. 1 and 2 consists therein that the fixed turning point C and the movable turning point or pivot D are exchanged, thereby obtaining a guidance of the magnet effected from outside of the game area of the table. In receptacles E arranged at the sides of this point the detachable handle 5, 7 and toy figures may be kept.

Instead of the means shown in Figs. 3, 5 and 6, respectively, serving to hold the magnet in all positions firmly pressed to the underside of the game square, thereby compensating eventual unevennesses, there may be arranged counterbalances at the ends of the lever arms 2*b*.

Alternatively it may be possible to press the fixed bearing points, e. g. the pivot A, by resilient means to the underside of the game table using tension springs or compression springs with the same results. According to Fig. 5 the lever systems 2 and 3 are preferably arranged in different planes, thereby bending, e. g. the lever system 3, so that both lever systems may pass over each other. With such an arrangement the magnet 1 may also slide over the middle line and, thereby, reach every point of the game area from all directions.

Figure 9:
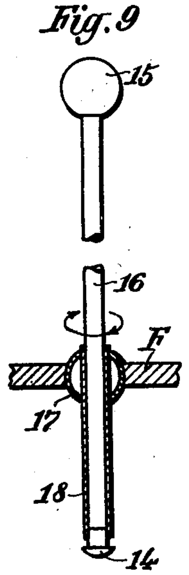
Fig. 9 shows a slightly modified form of the handle.

A different driving arrangement is shown in Figs. 7 and 8, the movement of point 14 at the under end of the handle 16 being transmitted by strings 22, 23, 25, 26 acting upon two rods 32 and 33, respectively, that are movable parallel to themselves and at right angles to each other. At their crossing point a sleeve 34 supporting the magnet 1 is arranged. According to Fig. 9 the handle 16 is supported in a ball joint 17 seated in a suitable socket in game table F and may be swivelled in all directions using a bushing 18 from which the handle 16 may be drawn by its operating knob 15. In Fig. 7 the actuation in the direction from above to below or vice versa is shown. For this purpose at the lower end of handle 16 or of bushing 18 a strip or string 22 is fixed which is trained over a rotary pulley 24 unto a small wheel or pulley 20 turning the latter wheel against the action of a spring or other resilient means 28 in one direction, the movement in the other direction being effected by the resilient force of the means 28. On the axle of the wheel 20 a disk of larger diameter 31 is arranged around which the string or strip 25 is trained. This strip or string is guided over rotary pulleys 27. String 25 is connected at the ends thereof to one end of rod 32. Another string is trained about the disk 31 and the ends thereof crossed as shown in dotted lines and trained over pulleys 27 to connect to the other end of rod 32, thereby transmitting to one end of rod 32 movement in an upward or downward direction in accordance with the movement of operating handle 16.

In the same manner, according to Fig. 8, the rod 33 is movable parallel to itself and at right angles to rod 32. For this purpose a pull string 23 is moved over a rotary pulley 30 and a pulley 21 against the action of a spring or other resilient means 29 fixed to the case of the toy. Upon the axle of pulley 21 a disk 19 is arranged over which a string or chain 26 is trained, transmitting movement to the ends of rod 33 in a manner similar to that above described for rod 32. As already shown in Fig. 7 there is arranged in the crossing point of the rods 32 and 33 a block or sleeve 34 bearing the magnet 1 having openings 35 and 36 for the passage of rods 32 and 33, respectively. By means of this arrangement the magnet 1 may be moved across the whole game table or square. With this arrangement in the same manner as in former figures means may be provided to secure the pressing of the magnet to the underside of the game square.

The choice of the ratio of diameters of the pulleys 20, 21 with respect to the discs 19, 31 gives the corresponding transmitting ratio, so that with relatively small movements of the handle the magnet may be moved over greater distances. By means of the rubber or spring retractors 28, 29 the magnet 1 will be brought automatically to a certain point as soon as the handle is released. That point may be marked on the gaming square, so that if the magnet loses one of the toy figures on the gaming square it is unnecessary to seek where the magnet is actually situated.

By the arrangement, shown in Figs. 7 and 8, the movements transverse of the table are independent from those longitudinally of the table so that practically every movement may be made with the desired exactness. By this it is possible to use the toy as a didactic play, e. g. for traffic instructions or the like.

There are shown in Figs. 11 to 18 several toy figures to be used together with the magnetic toy by way of example. According to Figs. 11 to 16 an auto-car 37 may be guided by magnet 1. This auto-car comprises a bow 38 of ferromagnetic material which is pivoted to the car at 39. This bow makes it possible for the car to ride over obstacles, e. g. the bridge 40 (Figs. 14 and 15) without disengaging the guidance of the car 37 from magnet 1. The bridge 40, for this purpose, is made from two parts and may be fixed to the game square with suitable stops. When the car crosses the bridge the bow 38 lowers and slides in contact with the game square F, thereby remaining within the area of effectiveness of magnet 1. The same arrangement may also be used to guide the car 37, e. g. onto a ferry 41, whereupon the ferry may be moved farther together with the car by magnet 1.

Still another form is shown in Fig. 17, whereby the figure of a traffic constable 42 is rotatably mounted on a pedestal 43 and has a magnetic rod 44 on its underside. If the magnet 1 approaches the magnetic rod 44 may be swung around according to the actual position of the magnet 1. Consequently the constable figure is turned around and indicates one or the other traffic direction.

Fig. 18 shows a railway gate movably supported on a fixed standard 46. The projecting end of the gate is connected with a rod or wire 48 of magnetic material through a lever system 47 that will be drawn in direction of the arrow on approaching of the magnet 1, thereby lifting the gate. As soon as the magnet is moved away and the influence on the rod or wire 48 ceases, the gate 45 lowers under the influence of its own weight.

Using the same principal figures with moving parts, e. g. animals or people with moving body parts may be provided which are moved in one direction when the magnet approaches, and lowered afterwards under action of their own weight when the magnet recedes.

Having thus described the invention, what is claimed as new and desired to be secured by Letters Patent, is:

1. A magnetic toy comprising, a gameboard of non-magnetic material, a movable magnet in contact with the underside of said board, a handle movable in all directions about a point positioned outside the limits of said board, mechanical means positioned in a plane parallel to and beneath said board connecting said handle to said magnet to transmit the exact components of the movement of said handle to said magnet in an amplified form, the ratio of amplification of said handle movements being a constant, a toy figure positioned on the upper side of said board and adapted to be moved by said magnet, said figure being provided with a magnetic element pivoted to the bottom thereof to swing about a horizontal axis and a pair of spaced bridge members disposed on the top surface of said game board over which the figure may be moved, said pivoted magnetic element being adapted to swing between said spaced bridge elements to maintain contact with the surface of the game board within the effective magnetic field of said movable magnet.

2. A magnetic toy comprising a playboard of non-magnetic material, a magnet movable adjacent to the underside of said board, a handle movable in all directions about a point positioned outside the play limits of said board, said handle having a portion extending above and a portion extending below the playboard, mechanical means positioned to move in planes parallel to and beneath said board connecting said handle to said magnet to transmit the exact components of the movement of said handle to said magnet in an amplified degree, the ratio of amplification of said handle movements being a constant, a toy figure positioned on the upper side of said board and adapted to be moved by said magnet, said mechanical means comprising a support for said magnet, two rods movable in separate parallel planes in directions at right angles to one another and operatively connected to said support, said planes, respectively, substantially including the axes of said rods, said mechanical means including flexible motion transmitting means respectively connecting the lower portion of said handle with motion amplifying means flexibly connected to said rods to move them in their respective directions.

3. A magnetic toy as defined in claim 2, wherein said support is formed with two guideways for said rods disposed transverse to one another, whereby the magnet support may slide along one rod while the other rod is being actuated to move the support in the corresponding direction.

4. A magnetic toy as defined in claim 2, including resilient means attached to one end of said flexible means for returning the same to a predetermined position.

5. A magnetic toy as defined in claim 2 wherein said flexible means includes cords connected at one end to the interior portion of said handle and extending in directions at right angles to one another, and said motion amplifying means including pulley means actuated by said cords respectively connected to transmit amplified movement to said rods.

6. A magnetic toy as defined in claim 2, wherein said toy figure is provided with a magnetic element pivoted to the bottom thereof to swing about a horizontal axis and a pair of spaced bridge members disposed on the top surface of said game board over which the figure may be moved, said pivoted magnetic element being adapted to swing between said spaced bridge elements to maintain contact with the surface of the game board within the effective magnetic field of said movable magnet.

References Cited in the file of this patent

UNITED STATES PATENTS

| | | |
|---|---|---|
| 2,651,140 | Kovac | Sept. 8, 1953 |

FOREIGN PATENTS

| | | |
|---|---|---|
| 602,622 | France | Dec. 28, 1925 |
| 823,717 | France | Oct. 25, 1937 |
| 573,995 | Great Britain | Dec. 17, 1945 |
| 607,903 | Great Britain | Sept. 7, 1948 |
| 144,036 | Australia | Oct. 31, 1951 |
| 836,617 | Germany | Apr. 15, 1952 |